Inventors
Charles D. Orth
Charles J. Treder
By Bayard H. Michael
Attorney

United States Patent Office 3,450,345
Patented June 17, 1969

---

3,450,345
BULBLESS THERMOSTATIC EXPANSION VALVE
Charles D. Orth, Cedarburg, and Charles F. Treder, Brookfield, Wis., assignors to Controls Company of America, Melrose Park, Ill., a corporation of Delaware
Filed Oct. 2, 1967, Ser. No. 672,079
Int. Cl. G05d 27/00; F25b 41/04
U.S. Cl. 236—92                                 1 Claim

ABSTRACT OF THE DISCLOSURE

The thermostatic expansion valve controls refrigerant flow to the evaporator in accordance with the pressure acting below the diaphragm and the temperature influencing the temperature responsive charged space above the diaphragm. The pressure is derived from the return conduit through the upper part of the body which leads from the evaporator outlet to the compressor inlet. The temperature is influenced by the temperature of the gas passing through the return conduit with the principal heat transfer occurring by conduction through the metal valve body since the restricted passages connecting the underside of the diaphragm to the return conduit largely serve for communication of pressure and there is no pressure differential promoting flow through the space underneath the diaphragm.

Background of invention

Thermostatic expansion valves generally include a charged diaphragm chamber connected to a sensing bulb by means of a capillary tube. The bulb is strapped on the outlet of the evaporator to sense the temperature at that point. The pressure of refrigerant leaving the expansion valve is normally communicated to the underside of the diaphragm so that the diaphragm motion is influenced both by the temperature induced pressure change above the diaphragm and by the outlet pressure acting under the diaphragm. Since the capillary tube is prone to damage and the bulb can be mounted in the wrong place it is desirable to eliminate the capillary tube and bulb.

In the prior art it has been suggested to mount the diaphragm chamber in a return conduit leading from the outlet of the evaporator to the inlet of the compressor. This, theoretically, would be ideal but in practice proves unacceptable since any liquid refrigerant in the return line will cause extremely rapid closing of the valve and results in unacceptable hunting.

Summary of invention

The present thermostatic expansion valve eliminates the tube and bulb of the prior art but avoids the hunting problems found in the prior efforts in this direction. This has been accomplished by having the refrigerant return conduit through the expansion valve body out of direct contact with the diaphragm and providing restricted passages between this return conduit and the underside of the diaphragm for the purpose of allowing the pressure in the return conduit to act on the underside of the diaphragm. The return passages, however, are situated in such a way that there is no pressure drop promoting flow from the return conduit to the chamber underneath the diaphragm. Therefore, any liquid in the return conduit is not likely to flow into the chamber under the diaphragm and, therefore, it is very unlikely that any liquid refrigerant will contact the diaphragm to cause improper response. The principal heat transfer to the charged diaphragm chamber occurs by conduction through the valve body and the valve body is provided with a considerable mass which has a heat sink effect damping sudden temperature changes to further smooth out the response.

Description of preferred embodiment

Figures 1, 2:
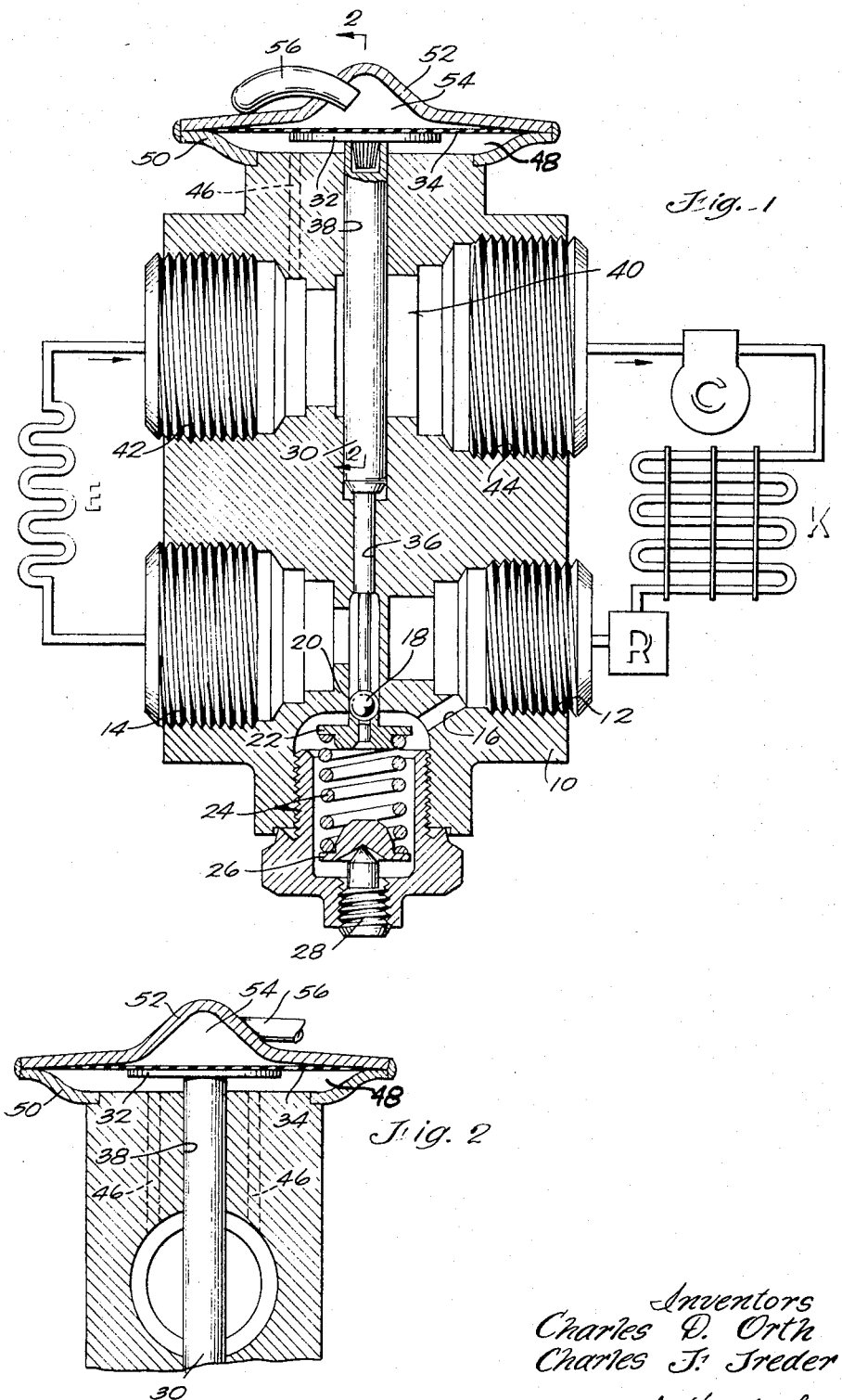
FIG. 1 is a vertical section through the valve with the valve being shown in a schematic refrigeration system.
FIG. 2 is a fragmentary view on line 2—2 of FIG. 1.

The lower portion of the valve body 10 is provided with what may be termed a feed or supply conduit having an inlet 12 and an outlet 14 separated by a partition through which the port 16 is provided to supply refrigerant to the space below the partition. The ball-type valve 18 cooperates with seat 20 to control flow from the inlet 12 to outlet 14. The ball is carried on member 22 which is urged in the valve closing direction by spring 24 compressed between member 22 and carrier 26 supported on the end of adjusting screw 28.

The valve 18 is actuated by push pin 30 (in practice pin 30 is two pieces) the upper end of which bears against pad 32 carried by diaphragm 34. Where the pin 30 passes through the body in bore 36 the fit is quite close so there will be minimal leakage along this portion of the pin since any such leakage will constitute a bypass. When the valve is used with an evaporator having a large internal pressure drop, it is necessary to have the diaphragm feel the pressure at the evaporator outlet rather than the inlet. If the inlet pressure can influence the diaphragm a high superheat condition results with accompanying evaporator inefficiency. The close fit between the pin and body works like a seal restricting the bypass of refrigerant from the outlet 14 to conduit 40 when a large pressure differential exists by reason of a large pressure drop in the coil E. The return of flow through conduit 40 allows the evaporator outlet pressure to act directly on the diaphragm and eliminates the need for the added capillary found in conventional valves extending from the chamber under the diaphragm (which must be sealed from the evaporator inlet) to the evaporator outlet. The fit need not be so close in bore 38 since leakage here is acceptable.

In the upper portion of the valve body there is a return conduit generally denoted 40 connected in the system as shown, that is the inlet 42 is connected to the outlet of evaporator E while the outlet 44 is connected to the inlet of compressor C. Pressure within return conduit 40 is communicated through the restricted passages 46, 46 to the chamber 48 below diaphragm 34. The diaphragm 34 is mounted between cup 50 and the domed head 52. Chamber 54 above the diaphragm is charged with a temperature responsive charge through the capillary tube 56 which is then sealed off.

Pressure in return conduit 40 can communicate with chamber 48 below the diaphragm through the restricted passages 46. There is no particular pressure gradient between the return conduit and the more or less dead-end chamber 48 to promote any active flow between the return conduit and chamber 48. Therefore, it is most unlikely that any liquid refrigerant passing through the return conduit would flow into the chamber 48 for possible contact with the diaphragm. Also since this is a dead-end chamber any changes in the temperature of refrigerant flowing through the return conduit would unlikely be sensed directly by reason of flow into the chamber 48. Therefore, the temperature affecting the charged chamber 54 is derived principally by heat transfer by conduction through the metal of the body. It will be noted that the partition separating the return conduit and the diaphragm assembly is quite substantial and this considerable mass of metal has a heat sink effect damping any sudden or transient temperature variations in the refrigerant flowing through the return conduit 40. Therefore, the response characteristics of the valve are quite smooth and free of hunting.

The valve is mounted without any usual remote sensing bulb. The compressor passes the hot refrigerant through condenser K to the receiver R. Flow from the receiver to the evaporator E is regulated in accordance with the temperature of the charged diaphragm chamber and the pressure in the chamber 48 below the diaphragm as influenced by the temperature and pressure of the gas leaving the evaporator E and passing through the valve body return conduit 40 for return to the compressor C.

The sensing location is now ideal and the response is smooth with marked freedom from hunting. Normally the valve will be mounted vertically as illustrated to minimize possibilities of liquid refrigerant entering the space below the diaphragm. It will be appreciated, however, that a considerable deviation from vertical can be tolerated without problems.

Care should be taken that the restricted passages 46, 46 connect into the conduit at the same relative position on the bore to minimize flow-inducing pressure conditions. In theory one restricted passage would serve as well as two and may in some cases be preferable. In some cases passages 46, 46 can be eliminated while providing a close fit between pin 30 in bore 38 (to provide a seal) so a capillary can be connected between chamber 48 and another part of the system such as the outlet of an evaporator pressure regulator valve located between the evaporator and the compressor.

We claim:
1. A thermostatic expansion valve having a body having upper and lower conduits therethrough separated by a wall,
a valve and valve seat in the lower conduit for regulating flow through the conduit,
a spring urging the valve to its seat,
a diaphragm mounted on the end of the body adjacent the upper conduit and between supporting cup and head members,
the space above the diaphragm between the head member and the diaphragm being charged with a temperature responsive charge,
a partition of large mass between the space below the diaphragm and the upper conduit to act as a heat sink damping temperature changes transferred through the supporting cup by conduction to the space above the diaphragm,
restricted passage means through the partition and connecting the space below the diaphragm to the upper conduit in such manner as to allow pressure variations in the conduit to act on the underside of the diaphragm but to avoid establishing pressure conditions including continuous flow through the space below the diaphragm,
a push pin having a close sliding fit passing through the wall and the partition and connecting the diaphragm to the valve,
and a spring aligned with the pin and acting on the valve, the spring being adjustable from outside the valve body.

References Cited

UNITED STATES PATENTS

| | | | |
|---|---|---|---|
| 2,277,998 | 3/1942 | Thompson | 236—92 |
| 2,571,625 | 10/1951 | Seldon | 236—92 X |
| 3,388,864 | 6/1968 | Noakes | 236—92 |

WILLIAM E. WAYNER, *Primary Examiner.*

U.S. Cl. X.R.

62—225

PO-1050
(5/69)

UNITED STATES PATENT OFFICE
CERTIFICATE OF CORRECTION

Patent No. 3,450,345            Dated June 17, 1969

Inventor(s) Charles D. Orth and Charles F. Treder

It is certified that error appears in the above-identified patent and that said Letters Patent are hereby corrected as shown below:

Column 4, line 20, "including" should read -- inducing --.

SIGNED AND
SEALED

SEP 2 - 1969

(SEAL)
Attest:

Edward M. Fletcher, Jr.
Attesting Officer

WILLIAM E. SCHUYLER,
Commissioner of Patent